(12) United States Patent
Zhu et al.

(10) Patent No.: US 11,701,777 B2
(45) Date of Patent: Jul. 18, 2023

(54) ADAPTIVE GRASP PLANNING FOR BIN PICKING (71) Applicant: FANUC CORPORATION, Yamanashi (JP)

(72) Inventors: Xinghao Zhu, Berkeley, CA (US); Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 416 days.

(21) Appl. No.: 16/839,807

(22) Filed: Apr. 3, 2020

(65) Prior Publication Data
US 2021/0308866 A1 Oct. 7, 2021

(51) Int. Cl.
B25J 9/16 (2006.01)
B25J 13/08 (2006.01)
B25J 19/04 (2006.01)

(52) U.S. Cl.
CPC ........... B25J 9/1666 (2013.01); B25J 9/1612 (2013.01); B25J 9/1679 (2013.01); B25J 9/1697 (2013.01); B25J 13/089 (2013.01); B25J 19/04 (2013.01)

(58) Field of Classification Search
CPC ...................................................... B25J 9/1612
See application file for complete search history.

(56) References Cited

U.S. PATENT DOCUMENTS

2012/0072022 A1* 3/2012 Kim ................. B25J 9/1666
700/255
2013/0184870 A1* 7/2013 Ota .................. B25J 9/1669
700/262
2019/0389062 A1* 12/2019 Truebenbach ......... B25J 9/1612
2020/0055680 A1* 2/2020 Chavan Dafle ........ B65G 61/00
2020/0189105 A1* 6/2020 Wen ....................... B25J 9/1669

FOREIGN PATENT DOCUMENTS

JP 4984576 B2 * 7/2012
WO WO-2019045779 A1 * 3/2019 .............. B25J 9/161

OTHER PUBLICATIONS

WIPO translation of JP 4984576 B2 (Year: 2012).*
https://www.pickit3d.com/; A plug and play 3D camera for your robot; Pickit Robot Vision Made Easy.

* cited by examiner

Primary Examiner — Nicholas Kiswanto
Assistant Examiner — Christopher A Buksa
(74) Attorney, Agent, or Firm — John A. Miller; Shumaker, Loop & Kendrick LLP (57) ABSTRACT An adaptive robot grasp planning technique for bin picking. Workpieces in a bin having random positions and poses are to be grasped by a robot and placed in a goal position and pose. The workpiece shape is analyzed to identify a plurality of robust grasp options, each grasp option having a position and orientation. The workpiece shape is also analyzed to determine a plurality of stable intermediate poses. Each individual workpiece in the bin is evaluated to identity a set of feasible grasps, and the workpiece is moved to the goal pose if such direct movement is possible. If direct movement is not possible, a search problem is formulated, where each stable intermediate pose is a node. The search problem is solved by evaluating the feasibility and optimality of each link between nodes. Feasibility of each link is evaluated in terms of collision avoidance constraints and robot joint motion constraints.

18 Claims, 7 Drawing Sheets

ADAPTIVE GRASP PLANNING FOR BIN PICKING

BACKGROUND

Field

The present disclosure relates to the field of industrial robot motion control and, more particularly, to a technique which plans a grasping pose of a robot gripper based on a predefined placement pose, where parts exist in random poses in a picking bin and a robot motion is found which picks a part from the bin and moves it to the defined placement location and pose in a single motion with no regrasping if possible, or in consecutive motions with minimum regrasping, while avoiding collisions of the robot with the bin, and remaining within robot joint motion limits.

Discussion of the Related Art

The use of industrial robots to perform a wide range of manufacturing, assembly and material movement operations is well known. One such application is a pick and place operation, where a robot picks up individual parts from a bin and places each part on a conveyor. An example of this application would be where parts which have been molded or machined are dropped into the bin and settle in random locations and orientations, and the robot is tasked with picking and placing each part in a predefined orientation (pose) on a conveyor which transports the parts for packaging or for further processing. Depending on the extent to which the parts in the bin are nestled together in a pile, finger-type graspers or suction-type grippers may be used as the robot tool. A vision system (one or more cameras) is typically used to identify the position and pose of individual parts in the bin.

Systems exist which plan the motion of the robot for the pick and place application described above, while adhering to the physical limits of motion of the robot joints, and also avoiding collisions of the robot or the part with the bin or any other obstacles. However, prior art systems are typically hard-coded to look for a particular preferred facet or surface of the part which can be reached by the suction gripper. If the preferred surface is accessible, the robot grips the part and places it on the conveyor in a single motion. If the preferred surface of the part is not accessible, the robot finds a pre-defined alternate gripping surface, moves the part to a pre-defined intermediate pose, re-grasps the part using the preferred surface, and then places the part on the conveyor.

The prior art systems of the type described above may miss opportunities to pick and place the part in a single motion, and may also select a motion sequence with an intermediate pose which causes the robot travel distance and joint motions to be greater than necessary.

In light of the circumstances described above, there is a need for a robot grasp planning technique which adaptively identifies the most efficient part gripping and motion sequence.

SUMMARY

In accordance with the teachings of the present disclosure, an adaptive robot grasp and motion planning technique is disclosed. Workpieces in a bin having random positions and poses are to be grasped by a robot and placed in a final position and pose. The workpiece shape is analyzed to identify a plurality of robust grasp options, each grasp option having a position and orientation. The workpiece shape is also analyzed to determine a plurality of stable intermediate poses. Each individual workpiece in the bin is evaluated to identify a set of feasible grasps, and the workpiece is moved to the final position and pose if such a direct movement is possible. If the direct movement is not possible, then a search problem is formulated, where each feasible grasp and each stable intermediate pose is a node. The search problem is solved by evaluating the feasibility and optimality of each link between the nodes. Feasibility of each robot movement is evaluated in terms of collision avoidance constraints and robot joint motion constraints. When the optimal solution to the search problem is found, robot motion commands are calculated and provided to the robot, and another part in the bin is evaluated.

DETAILED DESCRIPTION OF THE EMBODIMENTS

The following discussion of the embodiments of the disclosure directed to an adaptive robot grasp and motion planning technique is merely exemplary in nature, and is in no way intended to limit the disclosed devices and techniques or their applications or uses.

It is well known to use industrial robots for a variety of manufacturing, assembly and material movement operations. In some types of these operations, the robot must be programmed to move along a path having a start point and/or a destination (goal) point which are different from one operation to the next. For example, in a pick, move and place operation, parts in a bin having random locations and orientations must be picked up by a robot and moved to a predefined pose (orientation) on a conveyor. Parts may also arrive on an inbound conveyor in random locations and orientations, which also necessitates the calculation of a unique pick/move/place sequence for each individual part. Many other example applications exist where a new path must be computed for each individual task or operation of the robot.

Furthermore, in many robot workspace environments, obstacles are present and may be in the path of the robot's motion—that is, one or more obstacles may be located between the start and goal points, or stated more generally, between a robot's current position and the robot's destination position. When parts are provided in a bin, the bin itself represents an obstacle to the robot when picking up the parts.

Figure 1:
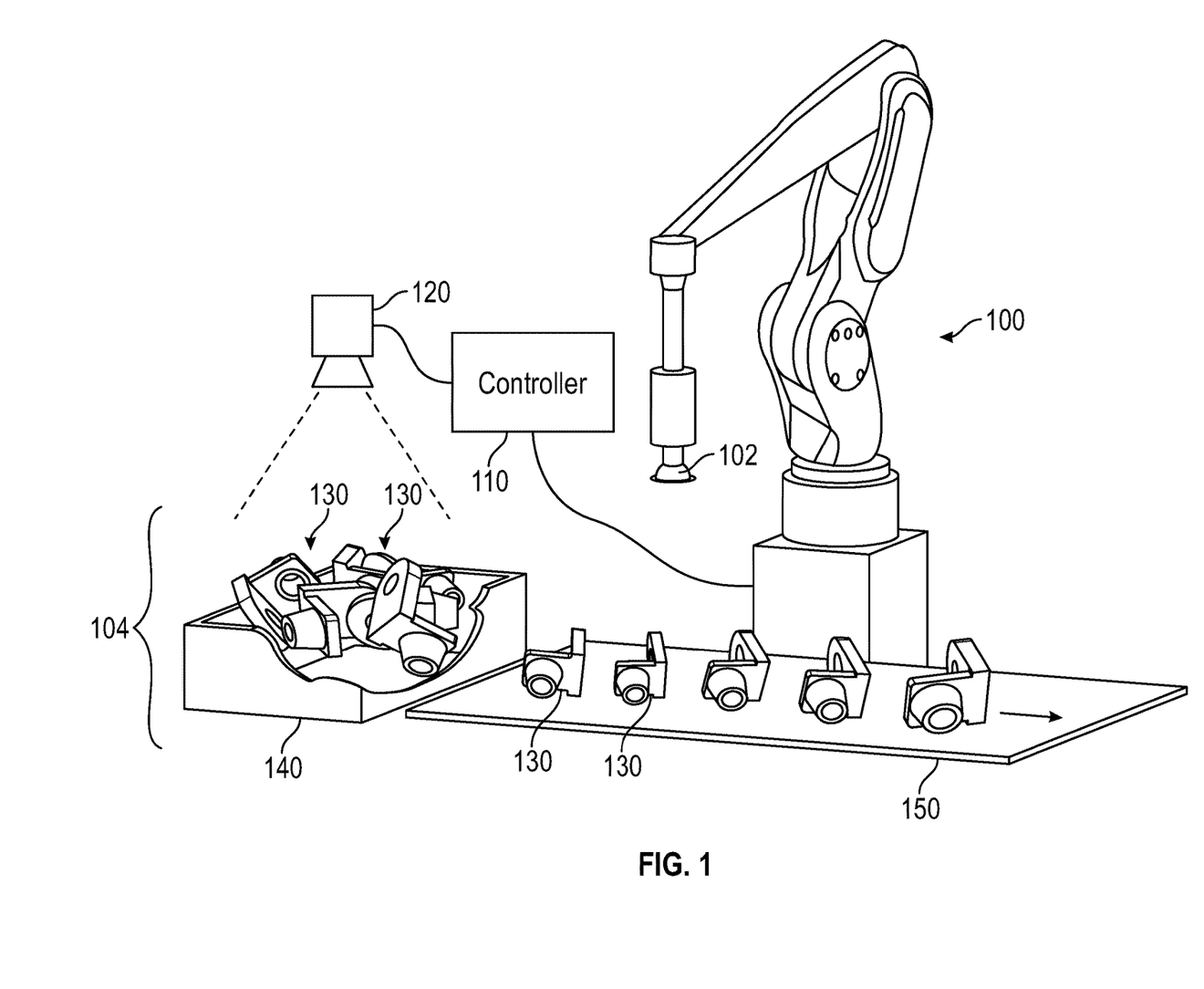
FIG. 1 is an illustration of workpieces in a bin which require placement at a predefined goal position and pose, such as on a conveyor.

FIG. 1 is an illustration of workpieces in a bin which require placement at a predefined goal position and pose, such as on a conveyor. FIG. 1 illustrates an industrial robot performing a pick, move and place operation in a scenario of the type described above, where each individual workpiece in a bin requires a unique gripping solution, which in turn necessitates a unique movement, reorientation and placement solution. The robot must perform the pick/move/place operation reliably (all parts placed on the conveyor in the proper pose, and no dropped parts), and the operation must be 100% free of any collisions (such as between a robot arm and the bin). In addition, because maximum part throughput rate is important, efficiency of the pick/move/place operation is essential.

A robot 100 having a gripper 102 operates within a workspace 104. Motion of the robot 100 is controlled by a controller 110, which typically communicates with the robot 100 via a cable 112. The controller 110 provides joint motion commands to the robot 100 and receives joint position data from encoders in the joints of the robot 100, as known in the art. The controller 110 also provides commands to control operation of the gripper 102. The pick, move and place scenario of FIG. 1 is merely illustrative and exemplary.

The adaptive grasp and motion planning techniques of the present disclosure are applicable to any type of robot operation where parts in random poses must be grasped and moved, and the suction cup gripper 102 may be replaced by a different type of gripper—such as finger-type.

A camera 120 communicates with the controller 110 and provides images of the workspace 104. In particular, images from the camera 120 are used to identify the position and orientation of workpieces to be operated on by the robot 100. In some embodiments, images from the camera 120 may be used to identify locations where a workpiece is to be placed by the robot 100, or even to identify moving or transient obstacles in the workspace 104. The camera 120 may be replaced by some other means (for example, another type of object sensor—radar, LiDAR, ultrasound, etc.) for identifying the positions and orientations of the workpieces being moved by the robot 100.

A plurality of workpieces 130 are contained in a bin 140. The task of the robot 100 is to pick up an individual workpiece 130 from the bin 140, move the workpiece 130 and place it on a conveyor 150 in a predefined pose (orientation), and repeat the operation on another workpiece. The camera 120 provides images of the workpieces 130 in the bin 140. An algorithm is used to identify an individual one of the workpieces 130 for the next pick operation—based on factors such as the height of a workpiece's center above the bottom of the bin 140, a centralized location within the bin 140, or accessibility of a preferred picking surface, for example.

The workpieces 130 all have the same orientation when placed on the conveyor 150. The several workpieces 130 on the conveyor 150 appear to have slightly different orientations in FIG. 1, but this is simply an illustration perspective effect. The orientation of the workpieces 130 on the conveyor 150 (known as the goal orientation) is predefined for optimum efficiency of a subsequent processing step—which could be packaging, painting, machining, or some other operation.

For each workpiece 130 in the bin 140, a new path must be computed by the controller 110 (or by another computer and then provided to the controller 110) which causes the robot 100 to move the gripper 102 from a home or approach position to pick up the workpiece 130 using a suitable grasp point and orientation, and move the workpiece 130 along a path to the goal position and orientation while avoiding obstacles such as the side of the bin 140, then return the gripper 102 to the home or approach position in preparation for the next workpiece 130. An intermediate stop may be required in some cases, where the robot 100 places the workpiece 130 down on a surface, re-grips the workpiece 130 at a different location, and moves the workpiece 130 to the goal. The grasp point and path for each workpiece must be computed by the controller 110 very quickly, because the path computation must be performed in real time as fast as the robot 100 can move one workpiece 130 and return to pick up the next.

Figure 2:
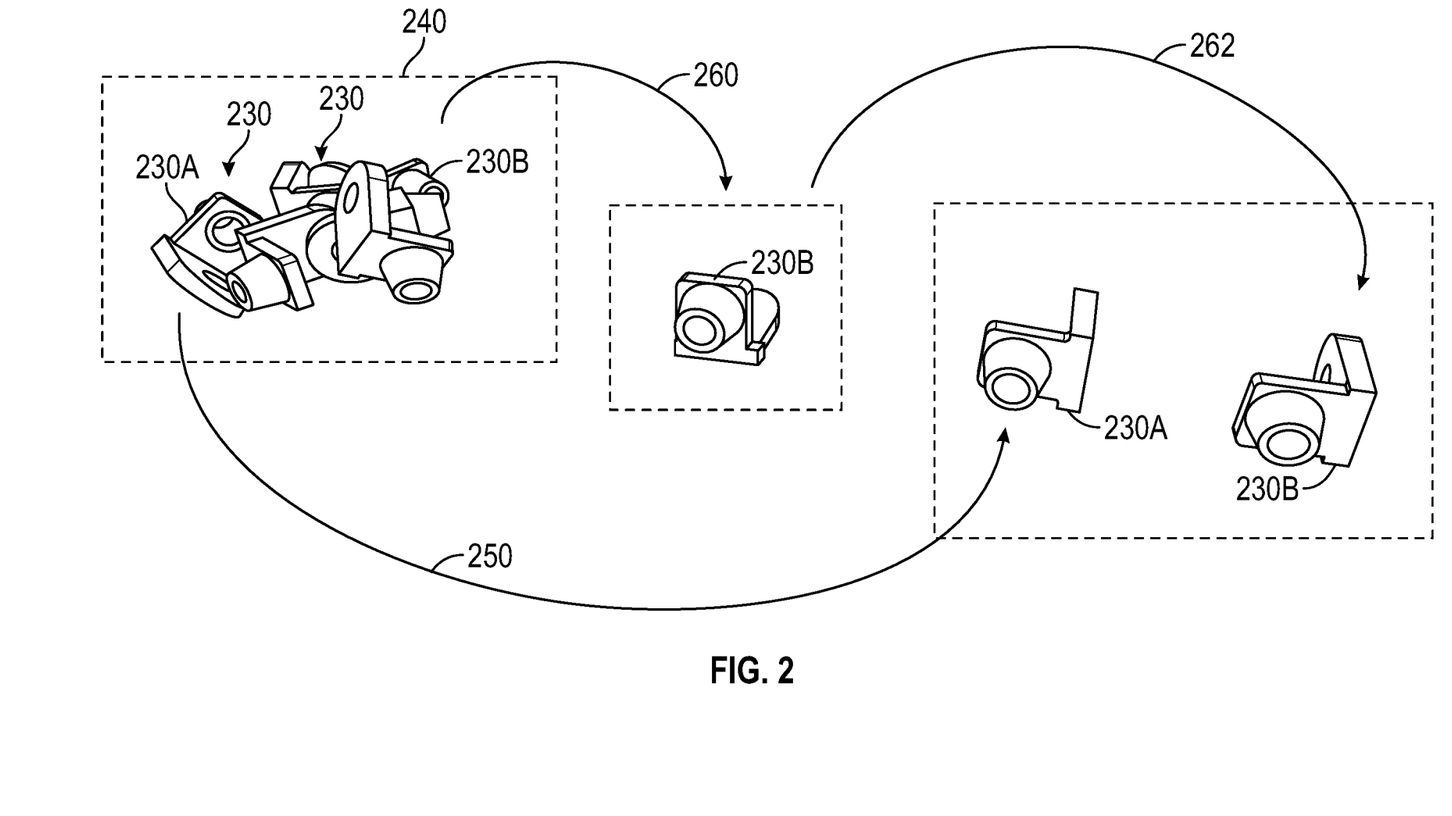
FIG. 2 is an illustration of workpieces in a bin being moved to the predefined goal position and pose, either via a direct transformation or via a predefined intermediate state, according to techniques known in the art.

FIG. 2 is an illustration of workpieces in a bin being moved to the predefined goal position and pose, either via a direct transformation or via a predefined intermediate state, according to techniques known in the art. Systems have been developed to perform the pick, move and place operation shown in FIG. 1. These existing systems typically use hard-coded, fixed logic for determining where the grasp the workpiece and whether or not an intermediate stop is required in order to place the workpiece in the predefined goal pose.

In FIG. 2, workpieces 230 are again situated in a bin 240 in random positions and orientations. A camera or other sensor (not shown) is again used to select an individual workpiece 230 and identify its position and orientation. In an ideal case, the selected workpiece 230 can be grasped (or "gripped") at a preferred location for a robust grip, moved and reoriented to the goal point in a single motion by the robot. This case is shown where a workpiece 230A is moved along a path 250 directly to the goal position and orientation.

It is well understood that articulated robots have joint motion limits which constrain robot flexibility. In many cases, therefore, it is not possible to move the workpiece 230 directly to the goal position and orientation in a single motion. For example, if a workpiece 230 is situated in the bin 240 with only a single face accessible, and grasping that face makes it impossible for the robot to move the workpiece 230 to the goal orientation, then at least one intermediate step is required. This case is shown where a workpiece 230B is moved along a path 260 to an intermediate state. The workpiece 230B is placed on a surface at the intermediate state and the robot lets go. The workpiece 230B is then re-gripped at a different point by the robot, and moved along a path 262 to the goal position and orientation.

In prior art systems, the possible initial grasping points on the workpiece 230, the workpiece orientation at the intermediate state, and the possible re-grasping points on the workpiece 230 are all hard-coded using fixed logic. This type of hard-coded logic requires time-consuming analysis and programming for each application (workpiece design, bin size/shape, goal orientation, etc.). In addition, this type of fixed logic is difficult to define for complex workpiece shapes, and the result may be that only a single preferred initial grip location is defined on the workpiece, and that preferred initial grip location will oftentimes not be accessible on many of the workpieces in the bin. Furthermore, the limited grasping point options and single intermediate state pose often lead to excessive robot joint motions and possibly even a need for a second intermediate state and second re-gripping in order to reach the goal orientation.

The grasp and motion planning techniques of the present disclosure are designed to optimize the efficiency of the pick/move/place operation by selecting any feasible initial grasp point which enables direct workpiece movement to the goal, and when direct single-step movement is not possible, selecting an initial grasp point and an intermediate pose which minimize robot motion.

Figure 3:
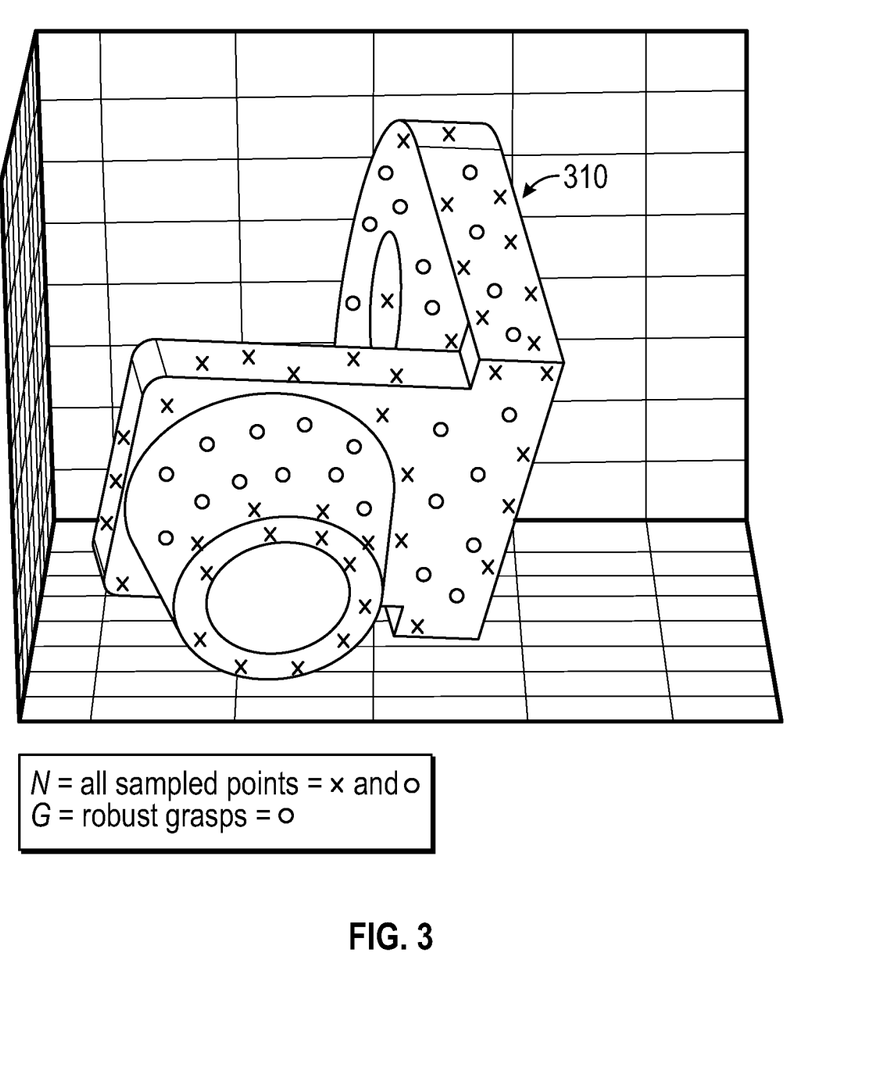
FIG. 3 is an illustration of a workpiece with a plurality of sample grasps identified, and each grasp evaluated as being robust or not, according to embodiments of the present disclosure.

FIG. 3 is an illustration of a workpiece 310 with a plurality of sample grasps identified, and each grasp evaluated as being robust or not, according to embodiments of the present disclosure. The first step in the method of the present disclosure is to generate a set G of robust grasp locations for the workpiece 310. Given a solid or 3D surface model of the workpiece 310, a set N of random sample grasp points on the surface of the workpiece 310 are defined using any suitable technique. The set N may include hundreds of points, although only a few dozen are illustrated in FIG. 3 for the sake of clarity. Each of the sample grasp points in the set N is analyzed to determine its suitability as a grasp point based on local area surface flatness. If an area of suitable size and flatness (for a reliable grasp by a suction cup gripper) around a particular point is found to exist, then that point is included in the set G of robust grasp locations. Points in the set G of robust grasp locations are shown in FIG. 3 with a small circle. If an area of suitable size and flatness around a particular point is found not to exist, then that point is not included in the set G of robust grasp locations, and is shown with a small x. The set N includes all sampled points, whether robust for grasping or not; the set G includes only the robust grasp locations.

For each point in the set G of robust grasp locations, a grasp orientation is also defined as being normal (perpendicular) to a local surface tangent plane. The grasp orientation is used to define the approach direction of the robot gripper tool when grasping the workpiece 310. Other factors may also be considered in determining which points to include in the set G of robust grasp locations. For example, for a particular grasp location and orientation, an offset distance of the center of mass of the workpiece 310 from a centerline of the robot gripper tool may be computed. If a particular grasp point is at a peripheral location on the workpiece 310 and the gripper tool centerline passes far from the workpiece center of mass, this grasp point may be rejected from the set G of robust grasp locations because it would cause a large bending moment on the suction cup gripper. The analysis of the workpiece 310 (that is, for a particular part design) to generate the set G of robust grasp locations is performed once at the outset, and then used in the grasping and motion planning calculations for each individual workpiece in a bin.

Figure 4:
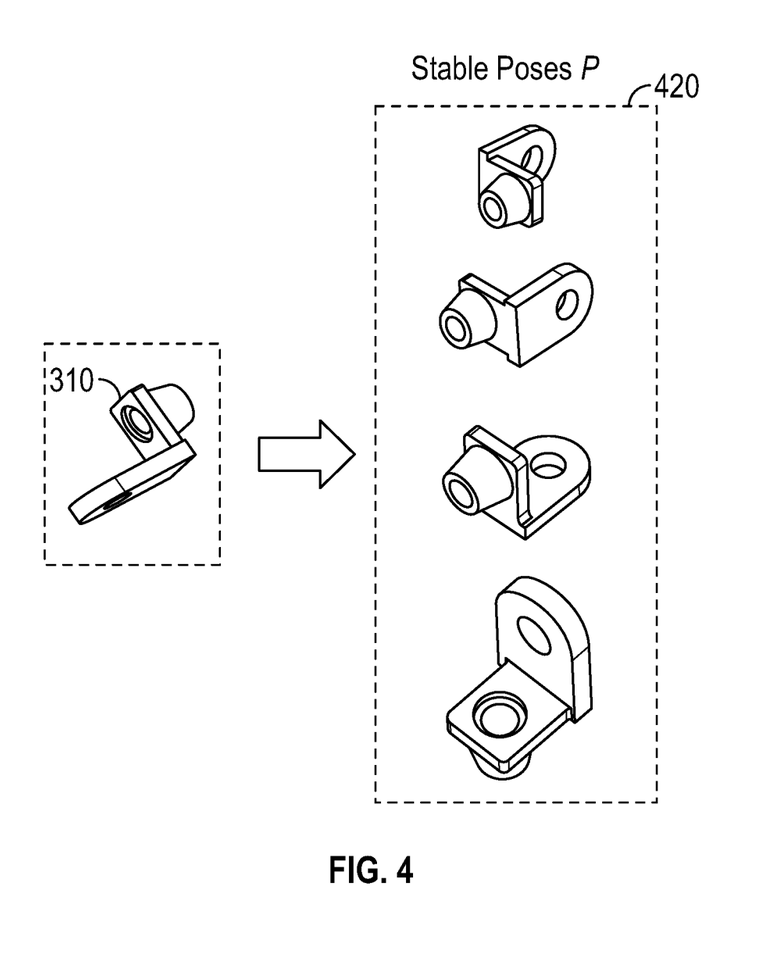
FIG. 4 is an illustration of a workpiece, with a number of stable workpiece poses identified, according to embodiments of the present disclosure.

FIG. 4 is an illustration of the workpiece 310, with a number of stable workpiece poses identified, according to embodiments of the present disclosure. In the adaptive grasp planning method of the present disclosure, when a direct transformation of a workpiece in a bin to the goal pose is not possible, many different combinations of initial grasps and intermediate poses are analyzed for feasibility and optimality. In order to perform this analysis, it is necessary to know in advance all of the stable poses of the workpiece 310. A stable pose is an orientation where the workpiece 310 will rest on a flat surface (or on a combination of points, lines and surfaces) without tipping.

One technique for identifying stable poses of a workpiece is to mathematically create a convex hull (such as a tetrahedron or an octahedron) around the workpiece, where the faces of the convex hull may all have different sizes, and then mathematically create a bounding ball having the workpiece center of mass as its center around the convex hull. Each face of the convex hull is then projected onto the bounding ball, resulting in an area S. The probability of stable placement of the workpiece on a surface represented by each face of the convex hull is proportional to the area S for that face divided by the surface area of the bounding ball. Intuitively, this means that the probability of stable placement is larger for larger faces of the convex hull.

Another alternative for identifying stable poses of a workpiece is simply to have a human experiment with the workpiece and find different poses in which a stable placement is possible, and then replicating those poses in a CAD solid modeling system.

In FIG. 4, a set P having four different stable poses for the workpiece 310 are shown in box 420. Each of the four stable poses is unique; that is, each of the stable poses has the workpiece 310 resting on a different face than the others. The analysis of the workpiece 310 to identify the set P of stable poses is performed once at the outset, and then used in the grasping and motion planning calculations for each individual workpiece in a bin.

As discussed above with respect to FIGS. 3 and 4, the method of the present disclosure first calculates the set G of robust grasps and the set P of stable poses for a workpiece. These calculations are a function of the workpiece shape only, and have nothing to do with how an individual workpiece is situated in a bin. A final (goal) pose B is also provided, including the goal position and orientation for the workpiece after placement by the robot. Then a bin containing many actual workpieces is provided, and images of the workpieces are analyzed. A particular workpiece is chosen for movement, and an initial pose A of the chosen workpiece is identified from the camera images.

For an individual workpiece in the bin, an analysis is then performed to determine which of the grasp points in the set G of robust grasps is possible based on the part's orientation and exposed surfaces in the bin. It is then determined whether any of the robust grasps which are possible will allow the workpiece to be moved directly in a single motion to the goal pose B. If any of the possible robust grasps allow the workpiece to be moved directly in a single motion to the goal pose B, the robot controller plans the robot motions using inverse kinematics, and checks for possible collisions (such as robot arm or tool with bin sidewall) and robot motion constraints. If any of the possible robust grasps allow the workpiece to be moved directly in a single motion to the final pose B, without collisions and within robot motion constraints, then the robot controller executes the planned robot motion commands to move the workpiece. If more than one possible robust grasp allows the workpiece to be moved directly in a single motion to the goal pose B, then a grasp and motion may be selected based on robustness of the grasp, efficiency of the motion, or other factors.

For an individual workpiece being evaluated, if none of the possible robust grasps allow the workpiece to be moved directly in a single motion to the goal pose B, then an analysis is undertaken to find a best grasp and motion including one or more intermediate states where the workpiece is temporarily placed and then re-grasped. This is discussed below.

Figure 5A:
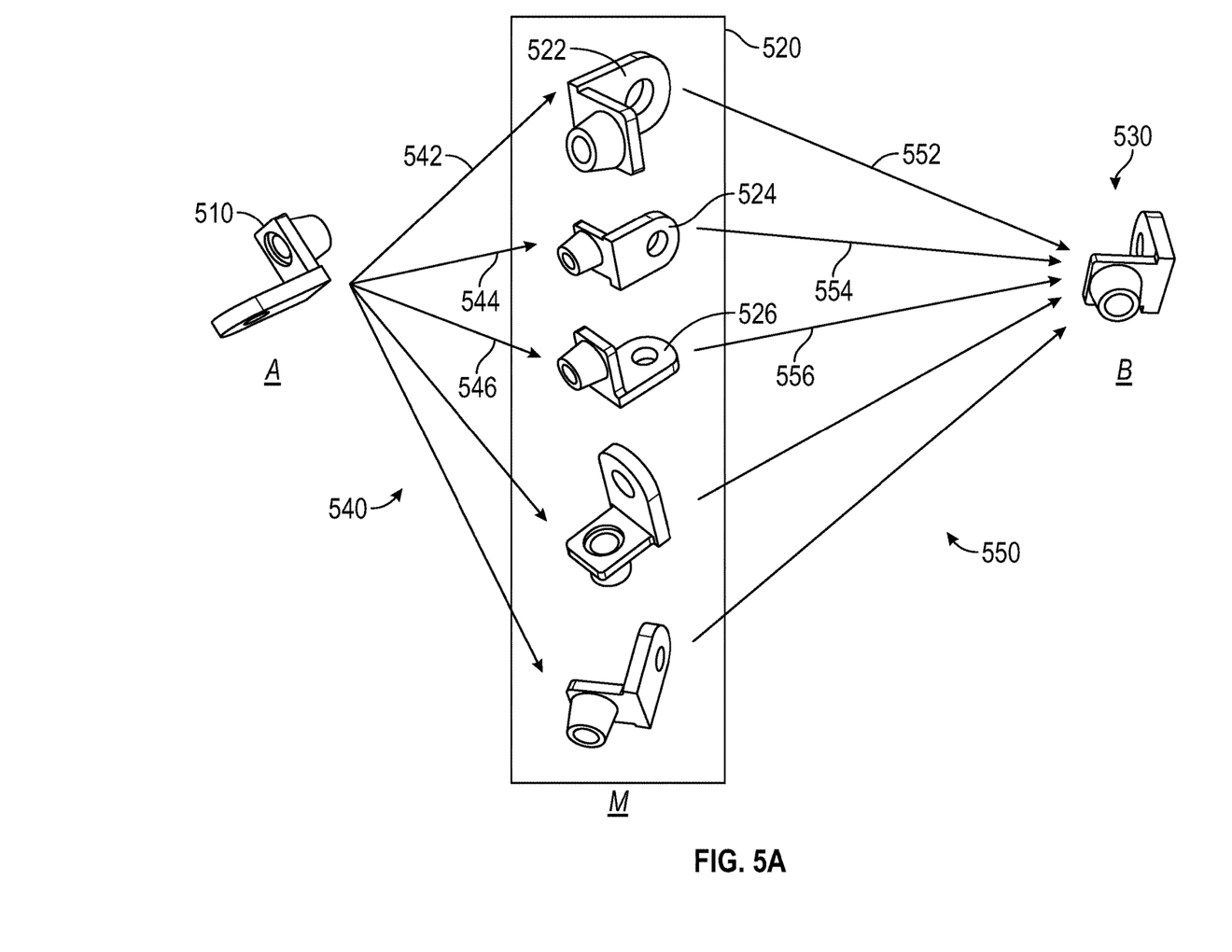
FIG. 5A is a graphical illustration of a search problem formulated to evaluate the feasibility and optimality of a plurality of paths from an initial workpiece pose through one stage of intermediate poses to a goal pose, according to embodiments of the present disclosure.

FIG. 5A is a graphical illustration of a search problem formulated to evaluate the feasibility and optimality of a plurality of paths from an initial workpiece pose through one stage of intermediate poses to a goal pose, according to embodiments of the present disclosure. A workpiece 510 is one of many workpieces in a bin to be picked and placed by a robot as discussed earlier. The workpiece 510 has already been analyzed to determine the set G of robust grasps and the set P of stable poses, as also discussed above with respect to FIGS. 3 and 4. In addition, the final (goal) pose B, including a goal position and orientation, has also been defined.

In FIG. 5A, the particular workpiece 510 has already been evaluated and it has been determined that no robust grasp point is accessible which allows the workpiece 510 to be moved from the initial pose A to the goal pose B in a single motion. In this situation, a search problem is formulated, considering all possible combinations of grasp points and stable intermediate poses. The set P of stable poses for the workpiece 510 are illustrated in box 520. Each stable pose in the set P is a node in the search problem. The workpiece 510 in the goal pose B is shown at 530. The search problem is formulated to consider paths 540 from the initial pose of the workpiece 510 to each of the stable poses in the box 520, and paths 550 from each of the stable poses in the box 520 to the goal pose B shown at 530.

The search problem is evaluated as follows. For an intermediate pose 522, it is determined whether at least one grasp point on the workpiece 510 is accessible, given the workpiece's initial pose, which allows the robot to move the workpiece 510 to the intermediate pose 522. If such a move is possible, then it is determined whether at least one grasp point on the workpiece 510 is accessible, given the workpiece's intermediate pose, which allows the robot to move the workpiece 510 to the goal pose B shown at 530. This analysis is also performed for the intermediate pose 524 (paths 544 and 554), the intermediate pose 526 (paths 546 and 556), etc. If only one path is feasible from the initial pose to the goal pose, then that feasible path is selected and the robot motion is planned. If more than one path is feasible, then an optimal path is selected, using minimum robot joint motion and/or gripper tool travel distances as the objective function. The selected path includes movement of the workpiece 510 from the initial pose A to an intermediate (middle) pose M, re-gripping the workpiece by the robot, and moving the workpiece 510 from the intermediate pose M to the goal pose B.

As discussed earlier, before commanding the robot to physically move the workpiece 510, the robot controller must plan the robot motions using inverse kinematics, and check for possible collisions (such as robot arm or tool with bin sidewall) and robot motion constraints. This robot motion planning may be performed before an optimal path is selected, in order to allow robot joint motion to be considered in the selection. Furthermore, it is possible that more than one robust grasp is feasible for moving the workpiece 510 from its initial pose to a particular intermediate state such as the intermediate pose 522. If the more than one feasible grasp are substantially different from each other (for example, grasp points on different surfaces of the workpiece 510 having orientation angles which differ by 45° or more), then each different feasible grasp is considered as a path in the search; that is, the path 542 actually has more than one variant.

To summarize FIG. 5A: the paths 540 from the initial pose of the workpiece 510 to each of the stable intermediate poses 520 are evaluated for feasibility; from each of the reachable intermediate poses 520, the paths 550 to the goal pose 530 are evaluated for feasibility; if more than one complete path is feasible, then the feasible complete paths are evaluated for optimality; an optimal path is chosen, and the robot is commanded to move the workpiece 510 from the initial pose to the selected intermediate pose M, re-grip and move the workpiece 510 to the goal pose 530. In the analysis carried out as shown on FIG. 5A, it is possible that no complete path is feasible; this might be the case when a workpiece is located in a corner of the bin, or the workpiece has an irregular design with few robust grasp points. If movement of a workpiece from the initial pose to the goal pose using a single intermediate pose M is not possible, then the search problem is re-formulated including a second stage of intermediate pose. This is discussed below.

Figure 5B:
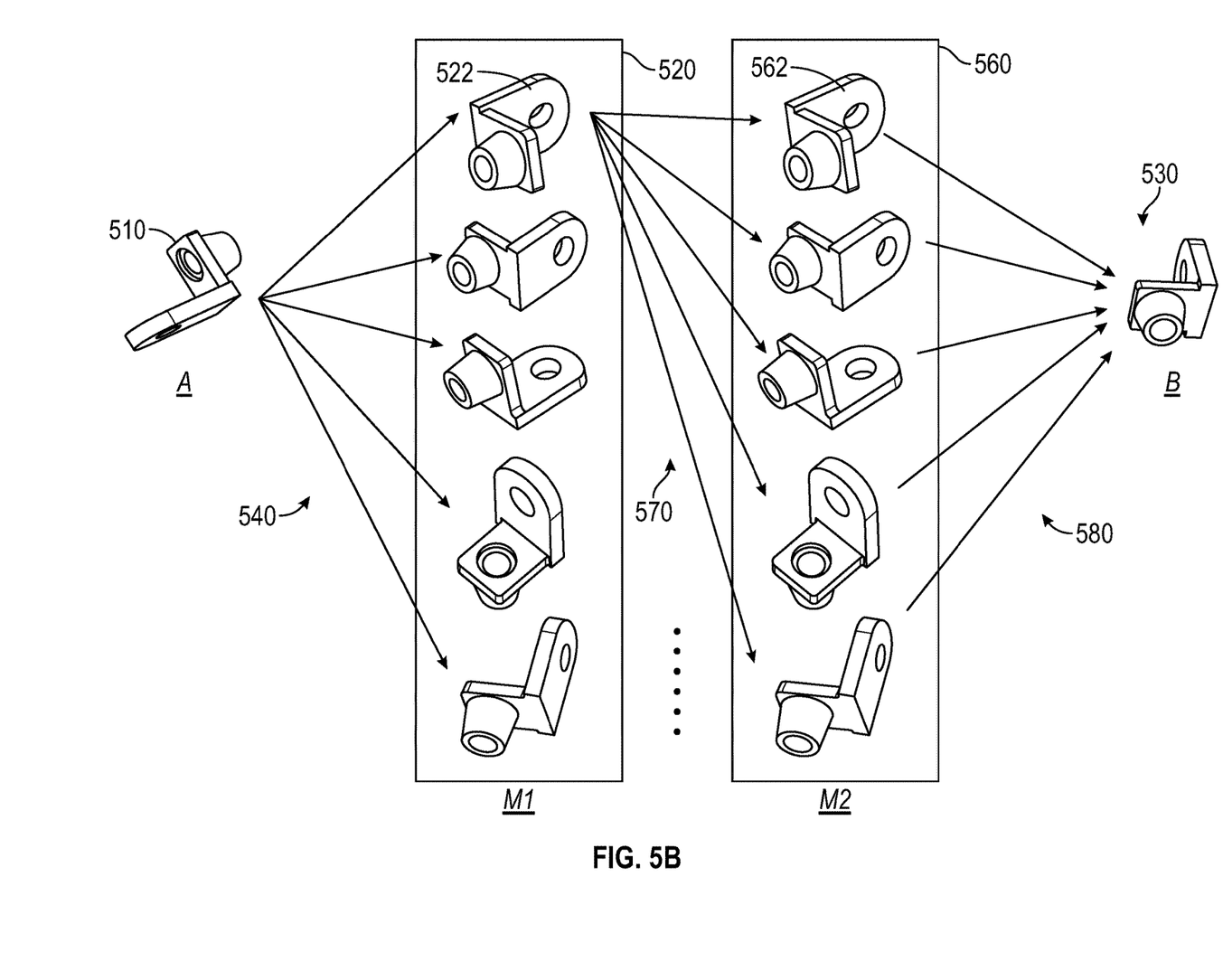
FIG. 5B is a graphical illustration of a search problem formulated to evaluate the feasibility and optimality of a plurality of paths from the initial workpiece pose through two or more stages of intermediate poses to the goal pose, according to embodiments of the present disclosure.

FIG. 5B is a graphical illustration of a search problem formulated to evaluate the feasibility and optimality of a plurality of paths from the initial workpiece pose through two or more stages of intermediate poses to the goal pose, according to embodiments of the present disclosure. In FIG. 5B, the workpiece 510 is again shown in an initial pose at the left. The stable poses are again shown in the box 520, along with the paths 540 from the initial pose to each of the stable poses. Now, however, the stable poses in the box 520 represent a first stage of intermediate pose, and a second stage of intermediate pose is shown in box 560. The second stage of intermediate pose in the box 560 includes the same set P of stable poses as in the box 520. At each stage of intermediate pose, the workpiece 510 is placed on a work surface, released by the robot gripper, and re-gripped using a different one of the grasps in the set G of robust grasps.

The formulation of the search problem continues as follows. A set of paths 570 is defined such that, from each reachable intermediate pose in the box 520 (first stage), using any robust grasp in the set G, a path is evaluated to each intermediate pose in the box 560 (second stage). Then, from each pose in the box 560 (second stage) which is reachable by one or more of the paths 570, using any robust grasp in the set G, a set of paths 580 to the goal pose 530 is evaluated. It can be appreciated that the search problem illustrated in FIG. 5B has many more paths and combinations than the search problem of FIG. 5A. A complete end-to-end path is defined as including one path from each of the sets 540, 570 and 580, along with two intermediate poses M1 and M2; for example, from the initial pose of the workpiece 510 to the first stage intermediate pose 522, to a second stage intermediate pose 562, to the goal pose 530. Each complete end-to-end path is evaluated in terms of feasibility, and then the feasible end-to-end paths are evaluated in terms of optimality.

From the analysis described above, an optimal path is chosen, and the robot is commanded to move the workpiece 510 from the initial pose A to the selected first stage intermediate pose M1, re-grip, move the workpiece 510 to the selected second stage intermediate pose M2, re-grip and move the workpiece 510 to the goal pose 530. In the unusual event that no feasible end-to-end path is found using the two intermediate pose stages of FIG. 5B, a search problem using three intermediate pose stages may be formulated and evaluated, and so forth.

Figure 6:
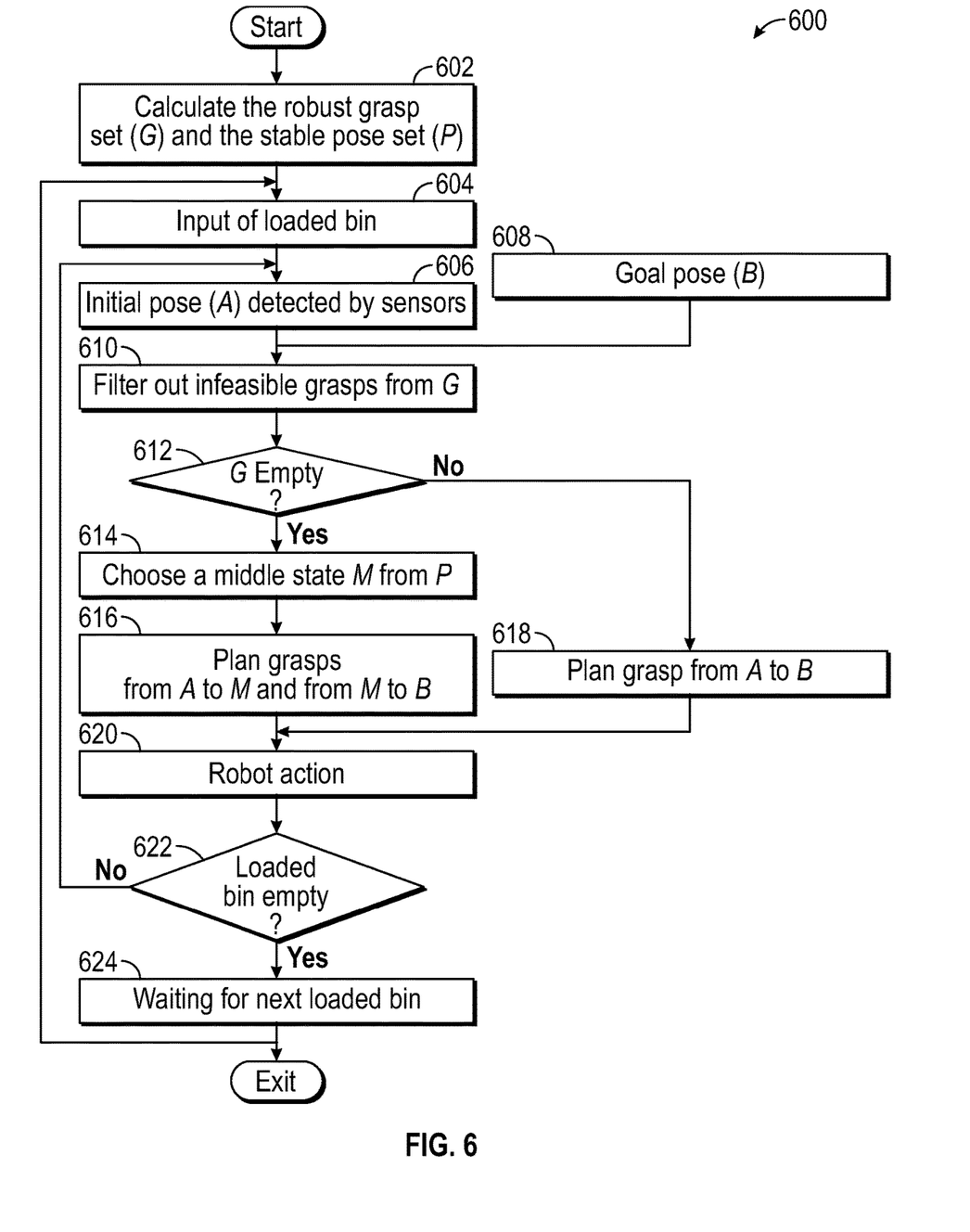
FIG. 6 is a flowchart diagram of a method for adaptive robot grasp and motion planning, including evaluation of a plurality of grasps and intermediate poses to optimize robot motion, according to an embodiment of the present disclosure.

FIG. 6 is a flowchart diagram 600 of a method for adaptive robot grasp and motion planning, including evaluation of a plurality of grasps and intermediate poses to optimize robot motion, according to an embodiment of the present disclosure. At box 602, the set G of robust grasps and the set P of stable poses are calculated for a workpiece, as shown in FIGS. 3 and 4 and discussed earlier. These calculations are a function of the workpiece shape only, and have nothing to do with how an individual workpiece is situated in a bin.

At box 604, a bin containing many actual workpieces is provided, and camera images (or sensor data) of the workpieces are provided. At box 606, an individual workpiece is chosen for movement, and an initial pose A of the chosen workpiece is determined from the camera images. At box 608, a goal pose B is also provided, including the goal position and orientation for the workpiece after placement by the robot. The final pose B could be the same for all workpieces in the bin, or the final pose B could be different from one workpiece to the next.

At box 610, infeasible grasps are filtered out of the set G of robust grasps. Infeasible grasps are those which are not possible, or do not allow the workpiece to be moved directly in a single motion to the goal pose B. First, grasps from the set G which are not possible based on the initial pose A of the chosen workpiece are eliminated. That is, only robust grasp points which are on surfaces of the workpiece which are exposed and facing toward open space are allowed to remain in the set G. Then, of the remaining grasps, those which do not enable a direct motion by the robot from the initial pose A to the goal pose B are eliminated.

At decision diamond 612, it is determined whether the set G is empty after elimination of infeasible grasps. If the set G is empty, then at box 614 a middle or intermediate state M is chosen from the set P of stable poses, and at box 616 the grasps and motions of the workpiece from the initial pose A to the intermediate state M and from the intermediate state M to the goal pose B are planned. The selection of the intermediate state M and the grasp and motion planning from A to M to B were discussed in detail with respect to FIG. 5A above. In the event that there is no feasible path from A to a single intermediate state M to B, then two or more stages of intermediate poses (such as M1 and M2) could be selected, as discussed earlier.

From the decision diamond 612, if the set G is not empty, then at box 618 the grasp and motion of the workpiece from the initial pose A directly to the goal pose B is planned. At box 620, robot motion commands are provided from the controller to the robot, causing the robot to physically grasp and move the workpiece from the initial pose A to the goal pose B. The grasping and movement of the workpiece from the initial pose A to the goal pose B is direct if possible (from the box 618), or uses one or more intermediate state M otherwise (from the boxes 614 and 616).

At decision diamond 622, it is determined from camera images if the current bin is empty. If the current bin is not empty, then the process loops back to the box 606 to identify a next workpiece and determine its initial pose A. If the current bin is empty at the decision diamond 622, then at box 624 the process waits for a next bin of workpieces to be loaded (and returns to the box 604), and if no next bin of workpieces is forthcoming, the process ends.

Throughout the preceding discussion, various computers and controllers are described and implied in connection with the disclosed method steps. It is to be understood that the software applications and modules of these computer and controllers are executed on one or more computing devices having a processor and a memory module. In particular, this includes a processor in the robot controller 110 of FIG. 1 discussed above. Specifically, the processor in the controller 110 is configured to adaptively plan the grasp and motion of workpieces in the manner described throughout the foregoing disclosure and particularly in the flowchart diagram 600. It is also possible for another computer to perform some or all of the grasp and motion planning and provide the computed path to the controller 110, in which case the controller 110 simply controls the robot 100, and the other computer is configured to perform the grasp and motion planning computations.

As outlined above, the disclosed techniques for adaptive robot grasp and motion planning improve the speed and reliability of robot grasp and path planning. The disclosed techniques provide more options than prior art techniques for grasping a workpiece and moving it to a goal pose in a single motion, and the disclosed techniques also find an optimal grasping and motion planning solution when an intermediate state placement of the workpiece is necessary on the way to the goal pose. The disclosed method is applicable to complex workpieces, eliminates up-front programming of static grips and poses, considers the most suitable temporary placement of the workpiece, and chooses a grasp to maximize grasp robustness and minimize robot travel distance.

While a number of exemplary aspects and embodiments of the adaptive robot grasp and motion planning technique have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A grasp planning method for an industrial robot, said method comprising:
    determining a set of robust grasps and a set of stable poses for a workpiece shape;
    determining an initial pose of a workpiece;
    providing a goal pose for the workpiece;
    removing infeasible grasps from the set of robust grasps, selecting a feasible grasp, and planning robot motions to grasp and move the workpiece directly from the initial pose to the goal pose, where removing infeasible grasps includes removing grasps which are not accessible by the robot based on the initial pose of the workpiece, and removing grasps which do not enable the robot to move the workpiece directly from the initial pose to the goal pose;
    when no feasible grasps exist, selecting an intermediate pose from the set of stable poses, and planning robot motions to grasp and move the workpiece from the initial pose to the selected intermediate pose, re-grasp and move the workpiece to the goal pose; and
    sending commands from a robot controller to the robot causing the robot to move the workpiece using the planned robot motions.

2. The method according to claim 1 wherein the initial pose, the goal pose and the intermediate pose each include a position and an orientation defined in a single common coordinate frame or in multiple coordinate frames having known relative position and orientation transformations.

3. The method according to claim 1 wherein determining an initial pose of a workpiece includes analyzing camera images or sensor data of a plurality of workpieces in a bin, where the workpieces have the workpiece shape.

4. The method according to claim 3 further comprising, after moving the workpiece using the planned robot motions, returning to determining an initial pose of another workpiece in the bin.

5. The method according to claim 1 wherein determining the set of robust grasps includes defining a plurality of sample points on a three-dimensional model of the workpiece shape, selecting individual sample points based on a size and surface flatness of a surrounding area, and including in the set of robust grasps the selected sample points each having an orientation vector normal to a surface tangent.

6. The method according to claim 1 wherein determining the set of stable poses includes identifying each unique pose in which the workpiece shape can be placed on a flat surface in a stable condition.

7. The method according to claim 1 wherein planning robot motions to grasp and move the workpiece includes using inverse kinematics calculations to compute robot joint motions which cause a gripper tool on the robot to grasp and move the workpiece, and further includes performing collision avoidance calculations for movements of the robot and the workpiece.

8. The method according to claim 1 wherein selecting an intermediate pose from the set of stable poses includes formulating a search problem including paths from the initial pose to each of the stable poses and paths from each of the stable poses to the goal pose.

9. The method according to claim 8 further comprising selecting the intermediate pose by solving the search problem to find a feasible and optimal path from the initial pose to one of the stable poses and to the goal pose, where optimality is determined by an objective function including workpiece travel distance, workpiece orientation change, robot joint travel angles, or a combination thereof.

10. The method according to claim 9 further comprising, when no intermediate pose is found with a feasible path, reformulating the search problem to include two or more intermediate poses.

11. A grasp planning system for an industrial robot, said system comprising:
 means for determining an initial pose of a workpiece; and
 a robot controller in communication with the robot, said controller having a processor and memory configured for;
 removing infeasible grasps from a set of robust grasps of the workpiece, selecting a feasible grasp, and planning robot motions to grasp and move the workpiece directly from the initial pose to a goal pose, where removing infeasible grasps includes removing grasps which are not accessible by the robot based on the initial pose of the workpiece, and removing grasps which do not enable the robot to move the workpiece directly from the initial pose to the goal pose;
 when no feasible grasps exist, selecting an intermediate pose from a set of stable poses of the workpiece, and planning robot motions to grasp and move the workpiece from the initial pose to the selected intermediate pose, re-grasp and move the workpiece to the goal pose; and
 sending commands to the robot causing the robot to move the workpiece using the planned robot motions.

12. The system according to claim 11 wherein the initial pose, the goal pose and the intermediate pose each include a position and an orientation.

13. The system according to claim 11 wherein the means for determining an initial pose of a workpiece includes a camera or sensor providing data to the controller about a plurality of workpieces in a bin.

14. The system according to claim 11 wherein the set of robust grasps is determined by defining a plurality of sample points on a three-dimensional model of the workpiece shape, selecting individual sample points based on a size and surface flatness of a surrounding area, and including in the set of robust grasps the selected sample points each having an orientation vector normal to a surface tangent.

15. The system according to claim 11 wherein the set of stable poses is determined by identifying each unique pose in which the workpiece shape can be placed on a flat surface in a stable condition.

16. The system according to claim 11 wherein planning robot motions to grasp and move the workpiece includes using inverse kinematics calculations to compute robot joint motions which cause a gripper tool on the robot to grasp and move the workpiece, and further includes performing collision avoidance calculations for movements of the robot and the workpiece.

17. The system according to claim 11 wherein selecting an intermediate pose from the set of stable poses includes formulating a search problem including paths from the initial pose to each of the stable poses and paths from each of the stable poses to the goal pose.

18. The system according to claim 17 further comprising selecting the intermediate pose by solving the search problem to find a feasible and optimal path from the initial pose to one of the stable poses and to the goal pose, where optimality is determined by an objective function including a weighted combination of workpiece travel distance, workpiece orientation change and robot joint travel angles, and further comprising, when no intermediate pose is found with a feasible path, reformulating the search problem to include two or more intermediate poses.

* * * * *